United States Patent Office 3,079,554
Patented Feb. 26, 1963

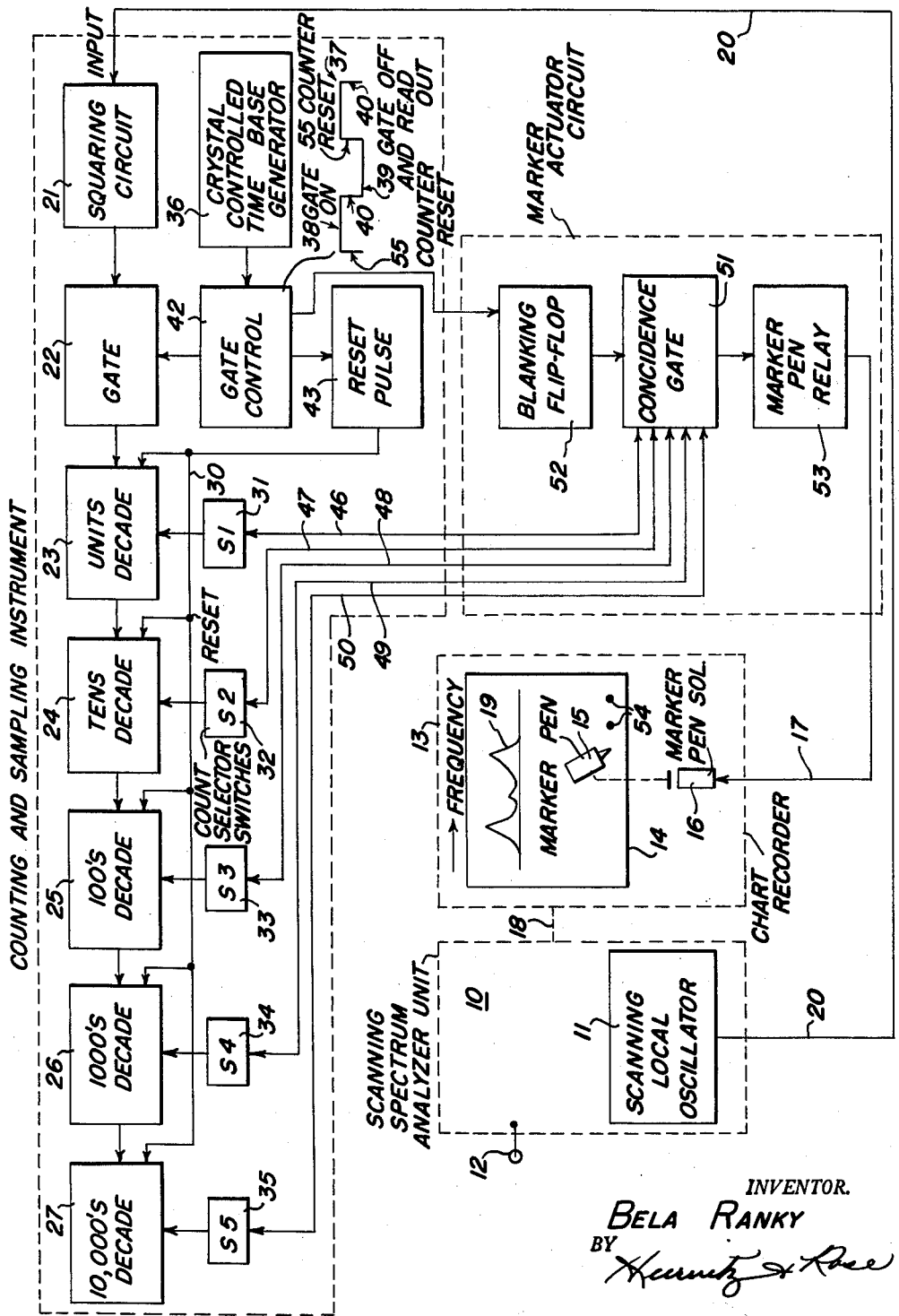

3,079,554
MARK GENERATOR
Bela Ranky, Flushing, N.Y., assignor, by mesne assignments, to The Singer Manufacturing Company, a corporation of New Jersey
Filed Nov. 17, 1959, Ser. No. 853,514
12 Claims. (Cl. 324—77)

The present invention relates generally to frequency scanning spectrum analyzers, and more particularly to systems for generating frequency markers for frequency scanning spectrum analyzers, or, more generally, for frequency scanning oscillators of general application.

The frequency scanning spectrum analyzer is essentially a super-heterodyne radio receiver, in which local oscillator frequency is scanned as a function of time to enable examination on a scanning basis of a frequency spectrum of interest. The response of the receiver to the frequency spectrum of interest, as the local oscillator of the receiver scans, is plotted as a function of local oscillator frequency on the face of a cathode ray tube or on a strip of recording paper, or the like.

In some spectrum analyzers, particularly those designed for analyzing low frequencies with extreme resolution, a serious problem exists of precisely interpreting a frequency plot, when obtained, in the sense of providing an accurate frequency calibration for the plot generated by the system. It is common for frequency plots to be constructed which require as much as 16 minutes per scan and in which the total scan is between 500 and 2,000 c.p.s. To provide accurate frequency calibrations for an analyzer of this character involves measurement of frequency, for each calibration mark, since one cannot rely on frequency scans and paper feeds of such durations to be sufficiently linear.

In accordance with the present invention, the output of a scanning local oscillator of a spectrum analyzer is applied to a digital counter, for successive predetermined intervals. Predetermined counts on the counter are utilized to actuate a marker, provided these predetermined counts are established during the predetermined time intervals and are attained precisely at the ends of the time intervals. In effect, then, the frequency of the scanning oscillator is sampled at intervals, and the fact that any given sample corresponds with a desired digital sum is recorded to provide a frequency marker.

It is, accordingly, a primary object of the present invention to provide a system for generating frequency markers for scanning spectrum analyzers.

It is a further object of the invention to provide a system for generating frequency markers to indicate as a function of time the values of frequency of a variable oscillator as the latter scans through a range of frequencies.

It is another object of the invention to provide a digital system of generating frequency markers for a frequency source having a wide range of output frequencies.

Another object of the invention is to provide a system for sampling the frequencies of a scanning oscillator at intervals, for detecting when the samples attain predetermined values in predetermined time intervals, and for generating a mark in response to such attainment.

The above and still further objects, features and advantages of the present invention will become apparent upon consideration of the following detailed description of one specific embodiment thereof, especially when taken in conjunction with the accompanying drawings, wherein:

The single FIGURE of the drawing is a functional block diagram of a system according to the invention.

Referring now more specifically to the accompanying drawings, the reference numeral 10 denotes a scanning spectrum analyzer unit, which may be of any conventional or unconventional character per se, and which includes a scanning local oscillator 11, and an input terminal 12 to which may be applied a spectrum which is subject to examination. A chart recorder 13 is provided which operates in conjunction with the scanning spectrum analyzer unit 10 and which includes a strip of record receiving paper 14, which is driven along the frequency axis in synchronism with scanning of the local oscillator 11, in any convenient and conventional fashion. The frequency markers are generated on the record receiver 14 by means of a marker pen, 15, which is actuated by a marker pen solenoid 16, the latter in turn being responsive to control signal applied over a lead 17. The co-action between the chart recorder 13 and the scanning spectrum analyzer unit 10 is indicated conventionally by the dotted line 18, which indicates that output signals of the scanning spectrum analyzer are applied to the chart recorder for recording of a frequency plot, as 19, and that the record receiving medium, constituting conventionally a paper strip 14, is driven in synchronism with scanning of the local oscillator 11. Combined units of this type are conventionally known and are available commercially.

The output of the scanning local oscillator 11 is applied on a lead 20 to a squaring circuit 21, which provides a square wave of constant amplitude to the input of gate 22. The output of the gate 22 is applied to cascaded decade counters, of which the unit decade is identified by the reference numeral 23 and the ten's, hundred's, thousand's and ten-thousand's decades by the reference numerals 24, 25, 26 and 27, respectively. While decade counters are employed in the preferred embodiment of the present invention, it will be appreciated that other types of counters may be employed, such as binary counters, binary-decimal counters, and the like. Reset signals are applied to the several decades 23 to 27, inclusive, via lead 30, so that all the decades may be concurrently reset to zero in response to a suitable reset signal. Switches 31, 32, 33, 34 and 35 are connected respectively with the decade units 23, 24, 25, 26 and 27, each one of the switches being arranged to select any desired unit of any one of the decades. So, the switch 31 may select any one of units zero to 9 in the unit's decade 23, the switch 32 may be set manually to select any desired unit in the ten's decade counter, from zero to 9, and so on. The switches 31 to 35 may also be utilized to disable ouptuts from any selected decade.

A crystal controlled extremely accurate time base generator 36 is provided, which generates square waves going alternately positive and negative for precisely predetermined time intervals. For the sake of simplicity of circuitry, the time intervals of the positive and negative portions of the output waves provided by the time base generator 36 may be equal, but this is not essential to the invention so long as the negative portions are sufficiently long to accomplish read-out and reset of the decades 23 to 27, inclusive, and so long as the duration of the positive portion of the wave is suitably selected for the application in hand, and is precise. A typical output wave provided by the time base generator 36 is indicated at 37 and includes a positive going portion 55, a negative going portion 40, a positive portion 38 and a negative portion 39. The positive portion 38 of the wave 37 is utilized as an on gating wave, the negative portion 39 as an off gating wave, and the transition portion 55 of the wave is utilized to provide a counter reset signal, for a purpose which will be described hereinafter, and in effect the portion 38 of the wave 37 defines a sampling interval.

The wave 37 is applied to a gate control device 42, which may be essentially an amplifier, positively going, for supplying on gating signal 38 to the gate 22. The gate control 42 also supplies a positively going portion 55 of the gating wave 37 to a reset pulse generator 43, which applies these pulses to the decades 23 to 27 via the lead 30, and resets these decades to zero.

The switches 30 to 35, inclusive, are set to provide output signals on lines 46 to 50, respectively, whenever the associated counters attain the values selected for the decades by the switches 30 to 35, inclusive. These signals are applied to a coincidence gate 51, there being also applied to the coincidence gate 51 the output of a blanking signal flip flop, 52, which is triggered by the reset pulse 43 and which turns on the coincidence gate 51 for the duration of the off-gating portion 39 of the wave 37 provided by the gate control 42, permitting the coincidence gates to operate only during the gate-off (read-out) period 39. Moreover, the coincidence gate 51 can operate only in portion 39 of the gate wave 37, i.e., only during the gate-off period defined by the gate wave portion 39, and cannot be operated while the decades 23 to 27, inclusive, are counting or being reset. The output of the coincidence gate 51 controls a marker pen relay 53, with suitable amplification if required, and the latter in turn supplies an actuating pulse over line 17 to the marker pen solenoid 16, to cause generation of a mark on the record receiver 14, typical marks being indicated at 54.

The operation of the present system may be best explained by reference to a set of numerical values. One such set of values which is typical of practical operating conditions involves a scan rate of 16 mins. or 960 sec., i.e., involves the scanning of the scanning oscillator 11 through its range in a period of 960 sec. The total width of scan may equal 480 c.p.s., i.e., the scanning local oscillator 11 may start at some predetermined value at the beginning of a 960 sec. time interval, and at the end of that period may have a value 480 c.p.s. higher. This implies a rate of change of frequency of ½ a cycle per second, per second. For this set of circumstances, a suitable sampling rate would be one count per second, i.e., the gate-on period 38 of the gating wave 37 may have a length of 1 second, precisely.

In our example, also, the decades 25, 26 and 27 may be effectively continuously connected to the coincidence gate 51 by the switches 33, 34, 35, respectively, so that their counts are immaterial, while the switches 31 and 32 may be set to select a zero reading for the decades involved. It will be appreciated that the selection of a zero reading is arbitrary, but it is a useful common practice to provide frequency markers representative of even numbers of hundreds of cycles. It would have been feasible also, especially for the suggested range of frequencies values, to set the units decades 23 to read out at a reading of zero and the tens decade at a reading of 5, so that coincident pulses would be applied to the coincident gate 51 from the units decade and tens decade 23 and 24, at the end of each count of 50.

However this may be, the coincidence gate 51 cannot operate in response to coincident counts of preset value deriving from the decades 23 and 24, unless the read out position is provided, signalling the end of a sampling period, i.e., the end of a one second interval in our example. At the beginning of each one second sampling period then the decades are permitted to commence count of cycles provided from the scanning local oscillator 11 over the lead 20, by opening of the gate 22. The count continues for one full second. At the end of that second a pulse is provided to the blanking flip-flop 52 and the coincident gate 51. It will signal the end of the sampling period and simultaneously signals are provided from the decades 23 and 24, if these have at that time attained the preset count, i.e., readings of zero, zero, in our example. If they have not, the coincidence gate does not operate and no mark is made. If they have, the coincidence gate does operate and a mark is made by the marker pen 15. It will be appreciated that the fact that a mark is made does not indicate that the scanning local oscillator has a frequency of 100 c.p.s., but rather that it has a frequency of an even multiple of 100 c.p.s. Generation of a mark, as at 54, does not indicate any specific frequency but does indicate that the frequency of the scanning local oscillator as sampled for the interval immediately preceding making the mark was an integral multiple of 100 c.p.s. The position of the mark on the paper strip 14 is then utilized to establish the precise meaning of the mark, since it can be assumed that the scanning local oscillator and the chart are synchronized and also that they both vary in reasonably linear fashion, in a scanning spectrum analyzer of commercial design, or if a non-linear frequency scan is utilized, that the law of variation is known. In any case, it can be deduced what the approximate significance of any mark represents in terms of frequency, and the precise value of the mark is provided by the present system.

It will be appreciated, for the example recited, that two counts or samplings per cycle change of frequency base line will take place, during each sampling interval. It follows that each cycle of change will be fully counted at least once, whether the count starts at the instant this frequency appears, or up to but not including one second after it has first appeared. The condition on the counter, which represents a 100 c.p.s. change in frequency of the scan base, is indicated by the fact that the last two digits of the counter readings are zero, and must be realized at least once each time a 100 c.p.s. change in frequency occurs. This example indicates the basis for establishing sampling times, i.e., the sampling rate must be a multiple, at least, of the fastest rate of change of the units being counted or sampled, which in the present situation is the frequency of the scanning local oscillator 11, in order to insure that no markers will be missed. Assuming a normal counter error of plus or minus one count, i.e., an accuracy of 1% for the system, it is entirely possible that two or even three markers may be produced for the same 100 c.p.s. frequency point. In such case, the first marker may be taken, to improve accuracy.

We may assume a further exemplary situation, in which the scan rate is speeded up by a factor of four, or the scan width is increased by a factor of four. In either of these cases, there is an increased rate of change of frequency by a factor of four, and the rate of frequency change is now two cycles of change per sample, instead of ½. It then becomes feasible that some desired 100 c.p.s. points will not be indicated on the record receiver 14. In fact, a 50% probability exists that this will not occur. However, loss of intermittent marker points does not detract from the utility of the present system since any reasonable number of marker points provide references, between which interpolations may be taken.

If markers are desired at intervals other than those specified above, i.e., at 100 c.p.s. intervals, the switches 30 to 35 may be appropriately set to provide additional markers. For example, markers may be provided for each thousand cycles per second, for each ten thousand cycles per second.

The scanning base need not start from zero, but may vary either upwards or downwards with respect to some fixed reference value. In order to attain a reading on the unit which corresponds to frequency deviation from the fixed reference value only, the set of values should be chosen so as to have zeros for those digits which will vary from the original center value during scanning. If the deviation from the center value adds to the center value, then the sampling and counting instrument may be set to read only those decades or units that will vary during a scan, and so the system will provide a direct reading of deviation only. If the deviation subtracts from the reference value, i.e., proceeds downwardly, then one of several procedures may be adopted. For example, the sampling and counting instrument may be made to count in reverse direction, whereupon the read out will be one of deviation only, neglecting the constant digits of the center value. On the other hand, a standard forward count may be used, but the numerical value significances of the read out decades may be reversed, i.e., for a count of one, a 9 may be indicated, for a count of two, an 8 may be indicated, and so on, i.e., the tens complement of the counted number may be employed.

To provide a numerical example, if a center frequency exists on the scanning oscillator 11 equal to 100,000 c.p.s., and if it is desired to provide markers for each 100 c.p.s. of deviation therefrom, for a total deviation of 10 k.c., the last three digits of the counter only need be utilized for application to the coincidence gate 51. In effect, the counter then ignores all frequencies above those for which indications are desired, but provides outputs at the coincidence gate 51 only in response to the desired frequency changes.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for generating frequency markers, comprising a source of electrical oscillations varying in frequency as a predetermined function of time, a counter, means for coupling said source of electrical oscillations to said counter only at intervals of accurately predetermined elapsed sampling times, and means for generating marks only in response to the simultaneous attainment of a single predetermined count of said counter and the terminations of said elapsed sampling times.

2. The combination according to claim 1 wherein said source of electrical oscillations is the local oscillator of a frequency scanning superheterodyne receiver.

3. The combination according to claim 1 wherein is provided a mark receiver moving as at least an approximate function of said frequency.

4. The combination according to claim 1 wherein said counter is a multiple decade counter, and wherein is provided means for deriving a signal only in response to and during attainment of a predetermined count by each of selected decades of said multiple decade counter, said means for generating marks being responsive only to concurrent existence of all said signals.

5. The combination according to claim 1 wherein is provided means for resetting all said counters on termination of each of said sampling times and preceding initiation of a succeeding one of said sampling times.

6. In a system for generating frequency markers, a frequency scanning oscillator, a plurality of counters interconnected in cascade, each of said counters being arranged to provide an output signal only on and during attainment of a predetermined count, each of said counters including provision for reset in response to a reset signal, a source of repetitive on-gating signals of predetermined duration each followed by an off-gating signal, means responsive to each of said on-gating signals for gating the output of said frequency scanning oscillator to the initial counter of said plurality of counters interconnected in cascade, means responsive to said off-gating signal for supplying said reset signal to reset all said counters, a coincidence circuit, means responsive to said off-gating signal for disabling said coincidence circuit, and means including said coincidence circuit and responsive only concurrently to termination of said on-gating signal and to sensing of predetermined counts in selected ones of said counters for providing a signal.

7. The combination according to claim 6 wherein is provided a spectrum analyzer of the frequency scanning superheterodyne type, and wherein said frequency scanning oscillator is the local oscillator of said spectrum analyzer.

8. In a system for generating frequency markers for a continuously varying frequency, a frequency scanning source of oscillations, a counter arranged to provide an output signal only on and during attainment of a predetermined count, said counter including provision for reset in response to a reset signal, a source of repetitive on-gating signals each of the same predetermined duration and each followed by an off-gating signal, means responsive to each of said on-gating signals for gating the output of said frequency scanning oscillator to said counter, means responsive to said off-gating signal for supplying said reset signal to reset all said counters, a coincidence circuit, means responsive to said off-gating signal for disabling said coincidence circuit, and means including said coincidence circuit and responsive only concurrently to termination of said on-gating signal to sensing of said output signal for providing a signal.

9. The combination according to claim 8 wherein said signal is a recorded mark.

10. In a system for generating frequency markers, a counter, a source of oscillations, means for gating said source of oscillations to said counter at discrete time intervals and for discrete accurately established predetermined time intervals, means for resetting said counter during each of the first mentioned time intervals, and means for recording an indication of the count of said counter only in response to termination of any of said discrete established time intervals which occurs only concurrently with attainment of a predetermined single count by said counter.

11. The system of claim 10 wherein said oscillations vary as a predetermined function of time.

12. The system of claim 10 wherein said predetermined single count is selectable.

References Cited in the file of this patent

UNITED STATES PATENTS

| | | |
|---|---|---|
| 2,403,918 | Grosdoff | July 16, 1946 |
| 2,513,360 | Rahmel | July 4, 1950 |
| 2,539,673 | Peterson | Jan. 30, 1951 |
| 2,657,307 | Balde | Oct. 27, 1953 |
| 2,789,277 | Beal et al. | Apr. 16, 1957 |
| 2,790,877 | Herman | Apr. 30, 1957 |
| 2,871,399 | Scuitto | Jan. 27, 1959 |
| 2,900,599 | Gray | Aug. 18, 1959 |
| 2,986,699 | McHenry | May 30, 1961 |

FOREIGN PATENTS

| | | |
|---|---|---|
| 770,035 | Great Britain | Mar. 13, 1957 |